US006748723B2

(12) United States Patent

Wadium et al.

(10) Patent No.: US 6,748,723 B2

(45) Date of Patent: Jun. 15, 2004

(54) APPARATUS AND METHOD FOR FILLING AND SEALING VALVED BAGS

(75) Inventors: Christopher Stephan Wadium, Salt Lake City, UT (US); Benjamin Bradly Petersen, Tooele, UT (US); Kenneth David Goodworth, Grantsville, UT (US); David Loyd Sorensen, Stansbury Park, UT (US); Daren Kay Searle, Centerville, UT (US)

(73) Assignee: Stone Container Corporation, Chicago, IL (US)

( * ) Notice: Subject to any disclaimer, the term of this patent is extended or adjusted under 35 U.S.C. 154(b) by 0 days.

(21) Appl. No.: 09/992,623

(22) Filed: Nov. 19, 2001

(65) Prior Publication Data

US 2002/0073657 A1 Jun. 20, 2002

Related U.S. Application Data

(60) Provisional application No. 60/249,952, filed on Nov. 20, 2000.

(51) Int. Cl.$^{7}$ .................................................. B65B 1/04

(52) U.S. Cl. ............................ 53/469; 53/450; 53/459; 53/463; 53/477; 53/373.7; 53/375.9; 53/DIG. 2; 53/284.7; 141/263

(58) Field of Search .......................... 53/450, 459, 463, 53/469, 477, 373.7, 375.9, DIG. 2, 284.7; 141/10, 263, 284, 351, 352, 313–317, 166

(56) References Cited

U.S. PATENT DOCUMENTS

| | | | | | |
|---|---|---|---|---|---|
| 4,003,188 | A | * | 1/1977 | Lau | 141/315 |
| 4,159,220 | A | | 6/1979 | Bosche et al. | 156/73.1 |
| 4,219,054 | A | | 8/1980 | Carter et al. | 141/10 |
| 4,401,140 | A | | 8/1983 | Vogel | 141/68 |
| 4,566,505 | A | * | 1/1986 | Ruf et al. | 141/317 |
| 4,574,720 | A | * | 3/1986 | Lepisto | 141/10 |
| 4,688,370 | A | | 8/1987 | Dighton et al. | 53/469 |
| 4,759,641 | A | | 7/1988 | Jacobs | 383/44 |
| 5,244,532 | A | | 9/1993 | Wadium et al. | 156/580.1 |
| 5,620,542 | A | * | 4/1997 | Avila et al. | 53/375.9 |
| 5,775,055 | A | * | 7/1998 | Giacomelli et al. | 53/DIG. 2 |
| 5,775,388 | A | | 7/1998 | Toft et al. | 141/313 |
| 6,164,823 | A | | 12/2000 | Donnell | 383/48 |

* cited by examiner

*Primary Examiner*—Rinaldi I. Rada
*Assistant Examiner*—Michelle Lopez
(74) *Attorney, Agent, or Firm*—Greenberg Traurig

(57) ABSTRACT

A method and apparatus for filling and sealing of containers, such as sealable valved bags are provided. A sealable valved bag is placed in an upright, erect position, with its sealable valve structure presented to the apparatus, in a slightly open position, amenable to receipt of a filling nozzle of a filling tube. A bag sealing apparatus is placed at the same position along a processing path as a filling apparatus. The filling apparatus and the sealing apparatus are both configured for reciprocable movement into and out of engagement with successive ones of the bags, to enable filling, and subsequent sealing of each of such bags, without intermediate indexing of bags from a filling station to a sealing station.

23 Claims, 6 Drawing Sheets

OVER ALL VIEW
SEALER 18
SEALER HORN 20
BAG CLAMP
REAR BAG FLAP 50
ACTUATOR 52
SIDE BAG SUPPORTS 31
FILLING TUBE 12
14
SEALER ANVIL 22
LINKAGE CYLINDER 24
FRONT LINKAGE 26
BAG CHAIR 16
REAR LINKAGE 28
DUST COLLECTION 58
10
29
30
54
56
12, 14

SIDE VIEW
FILL TUBE RETRACTED
BAG BEING SEALED
10
18
20
22
52
50
40
24
16
26
12
30
29
28
58
54

SIDE VIEW
FILL TUBE RETRACTED
18'
20'
22'
16'

10'
29'
12'
54'

APPARATUS AND METHOD FOR FILLING AND SEALING VALVED BAGS

This application claims priority of the filing date of U.S. provisional application serial No. 60/249,952, filed Nov. 20, 2000.

BACKGROUND OF THE INVENTION

1. Field of the Invention

The present invention is directed to methods and apparatus for filling and sealing valved bags, in which the bags are typically fabricated from at least one layer of paper material. The bags may be further provided with an inner liner layer of paper or plastic material. At least one end of the bag is typically formed by folded over flaps defining a valve passage, into which a valve structure is positioned or inserted. The valve structure may be typically fabricated from two opposing outer layers of paper material, and may have a valve liner structure incorporating alternatively a discrete liner structure fabricated from a sealable material such as a heat or sonically sealable plastic liner material. Alternatively, the typical two opposing outer layers of paper material may be coated with a heat or sonically sealable material.

2. Prior Art

Sealable cartons, containers and bags are known. One example of a prior art apparatus and method for sealing containers via ultrasonic vibrations is disclosed in Bosche et al., U.S. Pat. No. 4,159,220. Another example of an ultrasonic apparatus for sealing containers, such as paper bags fabricated from one or more layers of paper material is found in Wadium et al., U.S. Pat. No. 5,244,532.

Typically, in such prior art systems, containers, such as bags, are filled in an upright posture (to ensure complete filling), and are then transported along a processing path in an upright, vertical orientation, until the bags reach a sealing station. Typically the bag must be transported vertically, to prevent leakage (dusting) from the bag, prior to sealing. Within the sealing station, a portion of the container to be sealed is clamped within a heat sealing or ultrasonic vibration sealing apparatus. While such systems have worked more or less acceptably for relatively small or lightweight containers, such systems can be problematic, for use with heavier, larger or more cumbersome containers. For such containers, typically large, sophisticated, and/or expensive supporting or holding structures must be provided to maintain the containers in a vertical orientation. For example, it may be more difficult to transport them vertically, e.g., with centers of gravity elevated a significant distance above the conveyor.

Another prior art container sealing method and apparatus is disclosed in Avila et al., U.S. Pat. No. 5,620,542. This particular method and apparatus is intended for use with containers, such as bags fabricated from one or more layers of paper material, and may be provided with valve structures incorporating an interior flap, that is intended to reduce dusting, when the bag is placed on its side. The valve structure may also include an outwardly protruding portion that is amenable to heat or ultrasonic sealing by the clamping of a sealing apparatus to the protruding portion.

In this system, bags are transported along a conveyor path. The bags are typically filled while standing upright, and are then laid on their sides, with the "tops" of the bags oriented forward or downstream, and the bottoms of the bags oriented rearward or upstream, along the conveyor path. Each protruding valve structure extends sideways. The bags are typically positions more or less straddling a centerline of the conveyor belt, some distance away from each edge of the conveyor belt.

As each bag arrives at the sealing station, which is to one side of the conveyor belt, each successive bag is propelled sideways, until a "front" wall of the bag is more or less aligned with, or even extending slightly beyond one longitudinal edge of the conveyor belt, so that the protruding valve structure extends beyond the belt, to permit clamping by the sealing apparatus. After sealing of each bag, each bag is then transported along the path to the appropriate offloading location.

It would be desirable to provide a method for sealing of containers, such as valved bags, which shortens the length of the processing path.

It would further be desirable to provide a method of sealing of containers, such as valved bags, which would alleviate the need for laying of bags on their sides, for purposes of facilitating sealing of the bags.

These and other desirable characteristics of the present invention will become apparent in view of the present specification, including claims, and drawings.

SUMMARY OF THE INVENTION

The invention is directed, in part, to an apparatus for filling and sealing one or more containers, such as sealable valved bags, wherein the sealable valved bags are provided with outwardly extending sealable valve structures, the apparatus being disposed at a selected position along a processing path.

The apparatus comprises a support operably configured for receiving, in succession, a plurality of sealable valved bags, the support being operably configured to maintain each successive sealable valved bag in an upright, substantially erect orientation, with its sealable valve structure extending substantially horizontally toward the apparatus for filling and sealing one or more containers.

A filling tube is preferably operably connectable at one end to a source of filling material, the filling tube further having at an opposite end a filling nozzle, operably configured to enable the sealable valve structure of a sealable valved bag to fit around the filling nozzle.

The filling tube is preferably further operably configured to be reciprocably moved between a filling position to enable operable engagement with the sealable valve structure of a sealable valved bag, and a standoff position substantially removed from the sealable valved bag.

The filling tube is preferably further operably positioned at the selected position along the processing path.

The filling and sealing apparatus preferably further includes a sealing apparatus, also operably at the selected position along the processing path, the sealing apparatus including at least one sealing member operably configured to be reciprocably moved between a sealing position in operable engagement with a sealable valve structure of a sealable valved bag, and a standoff position substantially removed from the sealable valved bag.

In a preferred embodiment of the filling and sealing apparatus, the filling tube is configured to reciprocably pivot and translate between a horizontal filling position and a retracted position, in which the filling tube is tilted, filling nozzle upward, and moved backward from the horizontal filling position.

In an alternative embodiment of the filling and sealing apparatus, the filling tube is configured to reciprocably pivot and translate between a horizontal filling position and a retracted position, in which the filling tube is tilted, filling nozzle downward, and moved backward from the horizontal filling position.

In another alternative embodiment of the filling and sealing apparatus, the filling tube is configured to reciprocably move horizontally, between a filling position and a position moved backward from the filling position.

In a preferred embodiment of the filling and sealing apparatus, the sealing member includes at least one of: an ultrasonic horn, an ultrasonic anvil. Alternatively, the sealing member includes at least one of: a heat sealing member, an anvil.

Preferably, the support further comprises at least one bag bottom support member, operably disposed to vertically support bags, presented in succession, for filling and subsequent sealing. The support may further comprise at least one bag side support member, operably disposed for restricting lateral movement of bags, presented in succession, for filling and subsequent sealing.

The support may further comprise at least one bag back support member, operably disposed for selectively restricting backward movement away from the filling tube and sealing apparatus of bags, presented in succession, for filling and subsequent sealing. The at least one bag back support member preferably is operably configured to reciprocate between an open position, permitting a bag to be presented to and removed from the filling tube and sealing apparatus, and a closed position, preventing undesired movement of a bag away from the filling tube and sealing apparatus.

The filling and sealing apparatus may further comprise dust collection apparatus, operably configured for collecting and transporting away from the filling and sealing apparatus, stray filling material. The dust collection apparatus preferably may further comprise a flexible dust collection shroud, operably disposed to surround at least a portion of the filling tube; and a dust collection tube, connected to the flexible dust collection shroud and to a source of suction. The flexible dust collection shroud is preferably configured to accommodate reciprocable movement of the filling tube, so that collection of stray filling material may be conducted substantially continuously during operation of the filling and sealing apparatus.

The invention is also directed to a method for filling and sealing one or more containers, such as sealable valved bags, wherein the sealable valved bags are provided with outwardly extending sealable valve structures, the apparatus being disposed at a selected position along a processing path.

The method preferably comprises the steps of:

placing a sealable valved bag on a support operably configured for receiving, in succession, a plurality of sealable valved bags, the support being operably configured to maintain each successive sealable valved bag in an upright, substantially erect orientation, with its sealable valve structure extending substantially horizontally toward the apparatus for filling and sealing one or more containers;

filling the bag with a filling tube, operably connectable at one end to a source of filling material, the filling tube further having at an opposite end a filling nozzle, operably configured to enable the sealable valve structure of a sealable valved bag to fit around the filling nozzle, the filling tube being operably configured to be reciprocably moved between a filling position to enable operable engagement with the sealable valve structure of a sealable valved bag, and a standoff position substantially removed from the sealable valved bag, the filling tube being further operably positioned at a selected position along the processing path; and sealing the bag with a sealing apparatus, also operably at said selected position along the processing path, the sealing apparatus including at least one sealing member operably configured to be reciprocably moved between a sealing position in operable engagement with a sealable valve structure of a sealable valved bag, and a standoff position substantially removed from the sealable valved bag.

In the method, the filling tube may be configured to reciprocably pivot and translate between a horizontal filling position and a retracted position, in which the filling tube is tilted, filling nozzle upward, and moved backward from the horizontal filling position. Alternatively, the filling tube may be configured to reciprocably pivot and translate between a horizontal filling position and a retracted position, in which the filling tube is tilted, filling nozzle downward, and moved backward from the horizontal filling position. In a still further alternative embodiment, the filling tube may be configured to reciprocably move horizontally, between a filling position and a position moved backward from the filling position.

In the method, the sealing member may include at least one of: an ultrasonic horn, an ultrasonic anvil. Alternatively, the sealing member may include at least one of: a heat sealing member, an anvil.

In the method, the support preferably further comprises at least one bag bottom support member, operably disposed to vertically support bags, presented in succession, for filling and subsequent sealing. The support may further comprise at least one bag side support member, operably disposed for restricting lateral movement of bags, presented in succession, for filling and subsequent sealing.

The support may still further comprise at least one bag back support member, operably disposed for selectively restricting backward movement away from the filling tube and sealing apparatus of bags, presented in succession, for filling and subsequent sealing. In the method, the at least one bag back support member may be operably configured to reciprocate between an open position, permitting a bag to be presented to and removed from the filling tube and sealing apparatus, and a closed position, preventing undesired movement of a bag away from the filling tube and sealing apparatus.

The method may further comprise the step of collecting stray filling material with dust collection apparatus, operably configured for collecting and transporting away from the filling and sealing apparatus, stray filling material. The dust collection apparatus may further comprise a flexible dust collection shroud, operably disposed to surround at least a portion of the filling tube; and a dust collection tube, connected to the flexible dust collection shroud and to a source of suction. The flexible dust collection shroud may be configured to accommodate reciprocable movement of the filling tube, so that collection of stray filling material may be conducted substantially continuously during operation of the filling and sealing apparatus.

DETAILED DESCRIPTION OF THE DRAWINGS

Figures 1, 2:
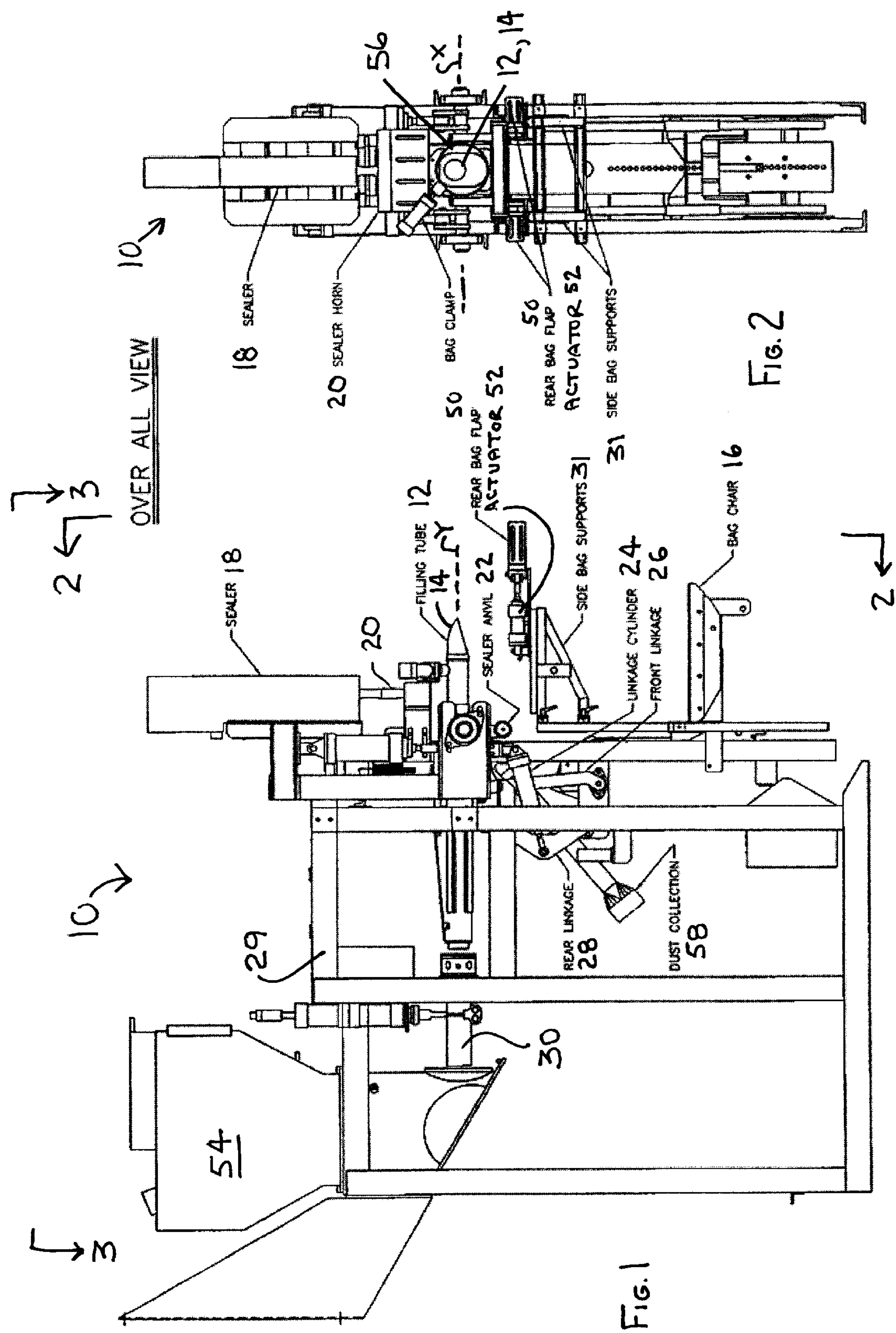
FIG. 1 is a side elevation of a filling and sealing apparatus according to a preferred embodiment of the invention, in which the rear bag flaps are open.
FIG. 2 is an end elevation thereof, looking in the direction of arrows 2—2 of FIG. 1, in which the rear bag flaps are open.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

Filling and sealing apparatus 10 of the present invention is shown in FIGS. 1–6. Filling and sealing apparatus 10 includes horizontally and pivotally reciprocable filling tube 12, which is connected to a source of filling material (not shown). Filling tube 12 ends in a nozzle 14 that may be of otherwise conventional configuration, for insertion into a sealable valve structure. The bag may be vertically supported by a support, bag chair 16, which may be a stationary support or representative of a conveyor belt, roller table, indexing conveyor structure, or similar structure, so long as it is configured to repeatably position individual bags in alignment with filling tube 12.

Sealer 18 includes a heating element or ultrasonic horn 20, that is suitably mounted for reciprocable vertical movement into and out of contact with an upper surface of a protruding valve structure of a sealable valve bag. Suitable controls and operating systems for actuating and generating heat and/or ultrasonic vibrations are provided. Such mechanisms, generally, are known in the prior art, and the specific details of which are readily understood by one of ordinary skill in the art. Therefore such details have been omitted for simplicity of illustration.

A pivotable sealer anvil 22 is pivotably mounted for movement about an axis X that passes more or less perpendicularly relative to a longitudinal axis of Y of filling tube 12, when tube 12 is in its extended position.

Suitable linkage elements, such as linkage cylinder 24, front linkage 26 and rear linkage 28, may be provided, for enabling selective coordinated combined longitudinal/pivotal reciprocation of filling tube 12.

Suitable framework 29 may be provided for supporting the various functional moving components of apparatus 10, as may be required or desired by the dictates of any particular installation. Such framework 29 may be configured as needed by one of ordinary skill in the art having the present disclosure before them, without departing from the scope of the present invention.

Figure 3:
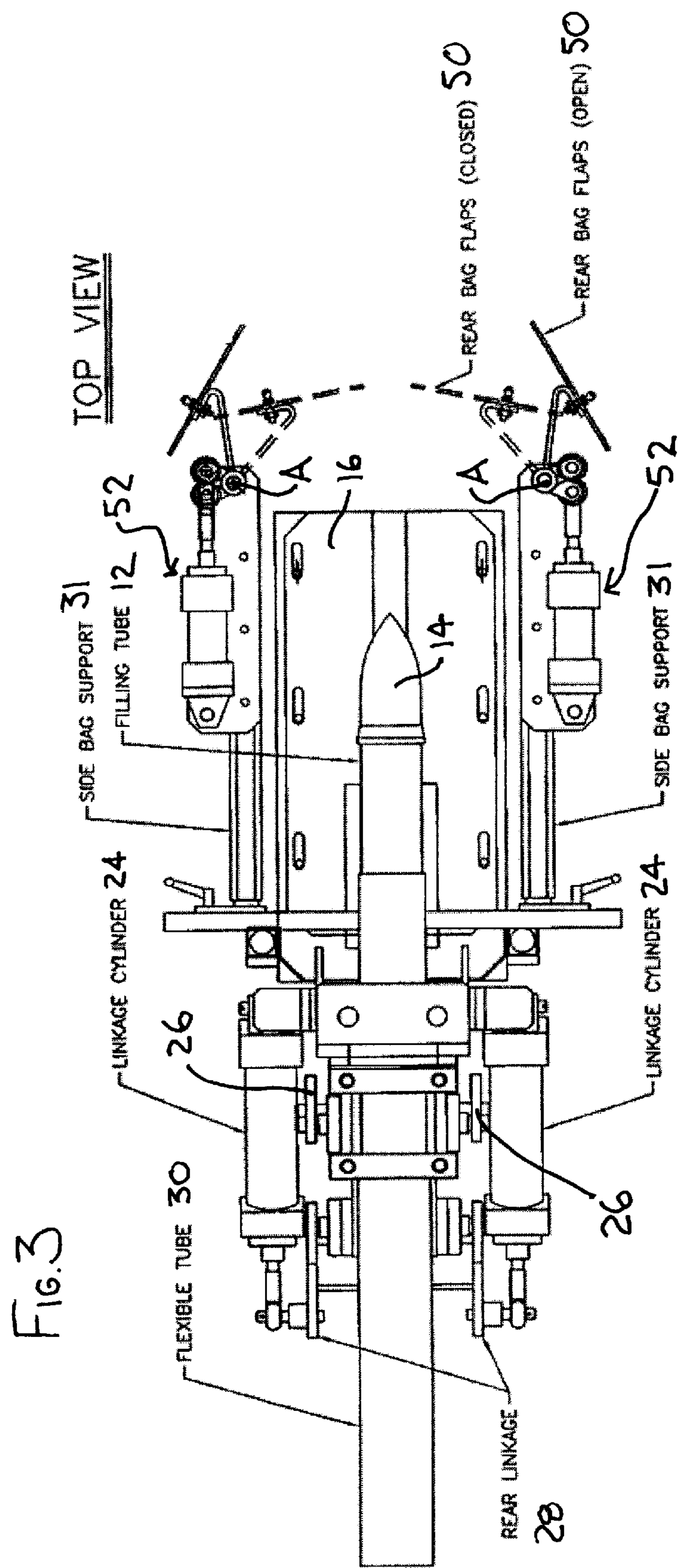
FIG. 3 is a fragmentary top plan view of the filling and sealing apparatus according to the embodiment of FIGS. 1–2, in which the rear bag flaps are shown in both open and closed positions.

FIG. 3 is a fragmentary top plan view of the filling and sealing apparatus 10, in particular showing the filling tube 12 and mechanism for moving the filling tube in and out of the valve structures of the bags. Flexible tube 30 is connected to the end of filling tube 12 distal to nozzle 14. Depending upon the material that is being put in the bags, flexible tube 30 may be fabricated from any suitable leak and sift proof flexible material, which may need to be a food-grade material, as requirements dictate. As shown and described herein, flexible tube 30 accommodates the horizontal and pivoting movement of filling tube 12.

In alternative embodiments of the invention, flexible tube 30 might be replaced, for example, by a rigid tube, having an end architecture configured to permit the adjacent end of filling tube 12 to be pivotably moved away from the rigid tube, when filling tube 12 moves to its retracted position. Suitable gasketing could be provided to provide an adequate seal at the interface of the adjoining tube ends, when filling tube 12 is in its extended position. Alternatively, other connecting tube constructions may be employed, so long as they permit or accommodate the pivoting movement of filling tube 12.

Stability of the bag during filling and sealing is of considerable importance. Accordingly, frame 29 preferably includes bag side supports 31 (FIGS. 1–3). Supports 31 may be of any suitable configuration, so long as their lateral spacing is sufficiently close to the width of a bag, as it is being filled and sealed, that the bag is prevented from toppling to either side. Tipping of the bags could lead to spillage and/or incomplete or inaccurate sealing of the bag valves.

Apparatus 10 also includes two rear bag flaps 50, which are located proximate the outer end of bag chair 16. Flaps 50 are mounted for reciprocating pivoting movement about vertical axes A. Each flap 50 is preferably in the form of an elongated rectangular paddle, which is substantially longer in the transverse direction than its vertical height (although other sizes and shapes may be used, if desired). Rear bag flaps 50 are propelled between their closed and open positions (FIG. 3) by rear bag flap actuators 52. Actuators 50 may be pneumatic or hydraulic cylinder and piston arrangements, as shown, or may be any other suitable type of actuator that is controlled by a suitably programmed control system. When flaps 50 are in their closed positions, they are either close to or in actual contact with the back (the side opposite the valve tube) of a bag that is sitting on the bag chair. This prevents a bag being filled and/or sealed from being pushed away (e.g., by the rising sealer anvil prior to sealing) or falling away from the filling spout or sealer mechanism. This helps ensure a complete and cleaner fill of the bags, and a more positively positioned seal of the bag valves.

While the side supports 31 and the rear bag flaps 50 are shown in particular configurations, other configurations for the side supports 31 and the rear bag flaps 50 may be used, as desired or required by a particular installation.

Apparatus 10 also includes an improved dust collecting mechanism. Surrounding the end of filling tube 12 distal to nozzle 14, a flexible shroud 56 is position, which is connected to a dust collection tube 58, which, in turn is connected to a vacuum source (not shown). Shroud 56 may be of any suitable shape and flexible material, as such dust collection shrouds are generally known in the art of bag filling apparatus. As is typically done, filling tube 12 actually enters into shroud 56 through a substantially sealed aperture (not shown). While filling tube 12 is movable (whether pivoting or longitudinally reciprocating), the dust collection mechanism, comprising shroud 56 and dust collection tube 58, is substantially not movable, although those portions of shroud 58 that are directly connected to filling tube 12 must be sufficiently flexible to accommodate the movements of filling tube 12, and maintain a substantially sealed relationship to filling tube 12 throughout its movements.

Figure 4:
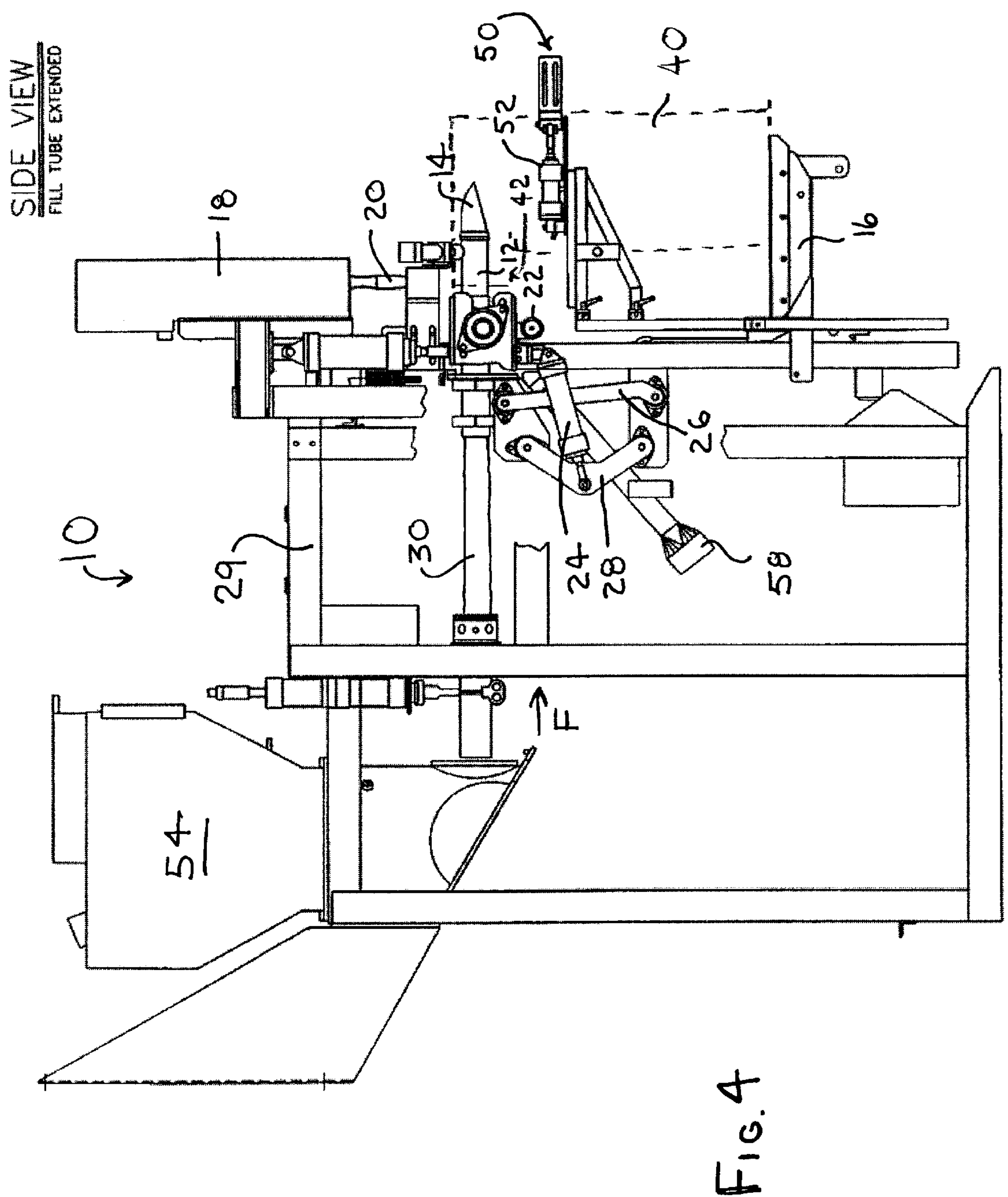
FIG. 4 is an enlarged fragmentary side elevation of the filling and sealing apparatus of FIGS. 1–3, showing the filling tube in an extended position, in which the rear bag flaps are open.
Figure 5:
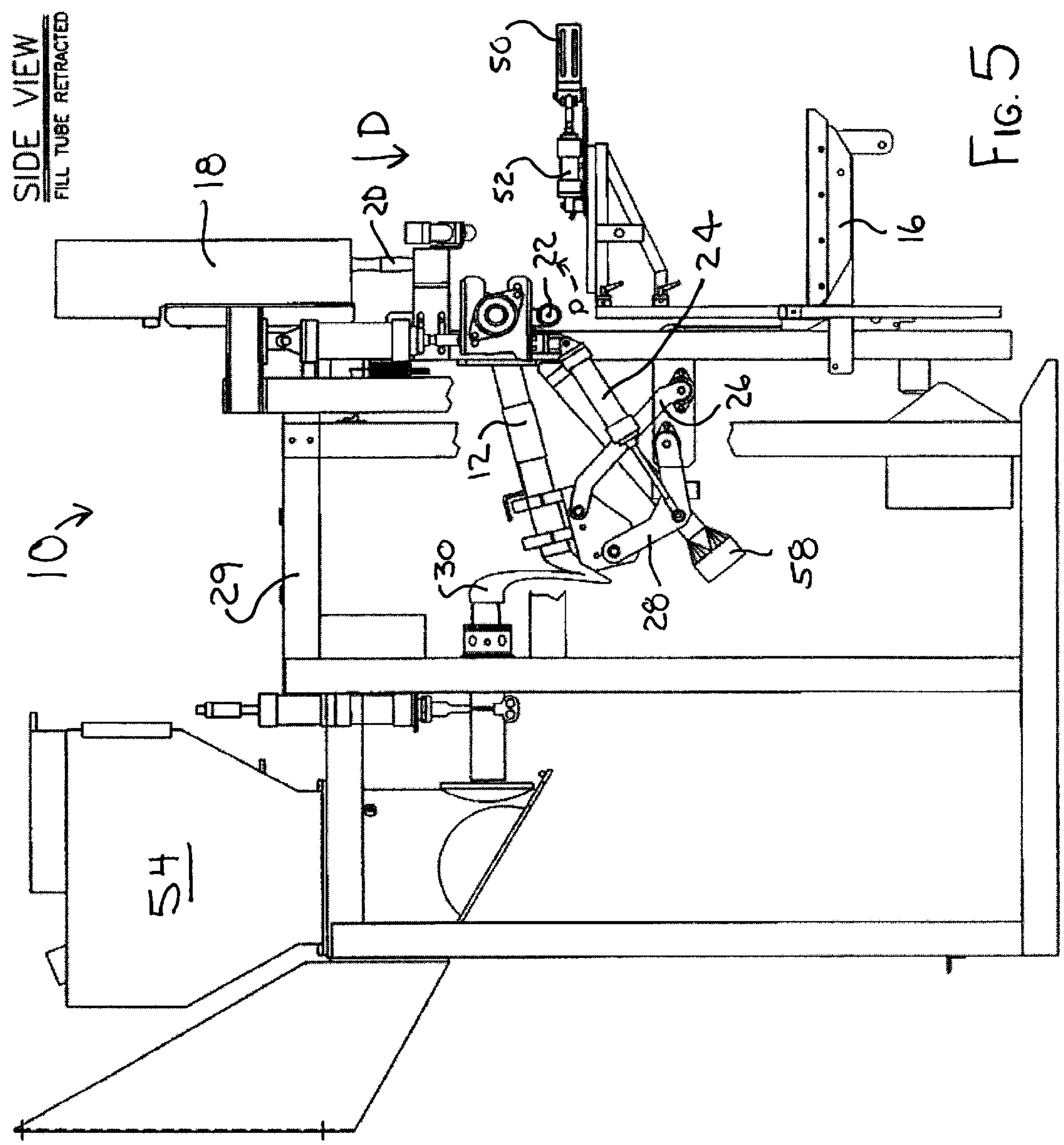
FIG. 5 is an enlarged fragmentary side elevation of the filling and sealing apparatus of FIGS. 1–4, showing the filling tube in a retracted position, in which the rear bag flaps are open.
Figure 6:
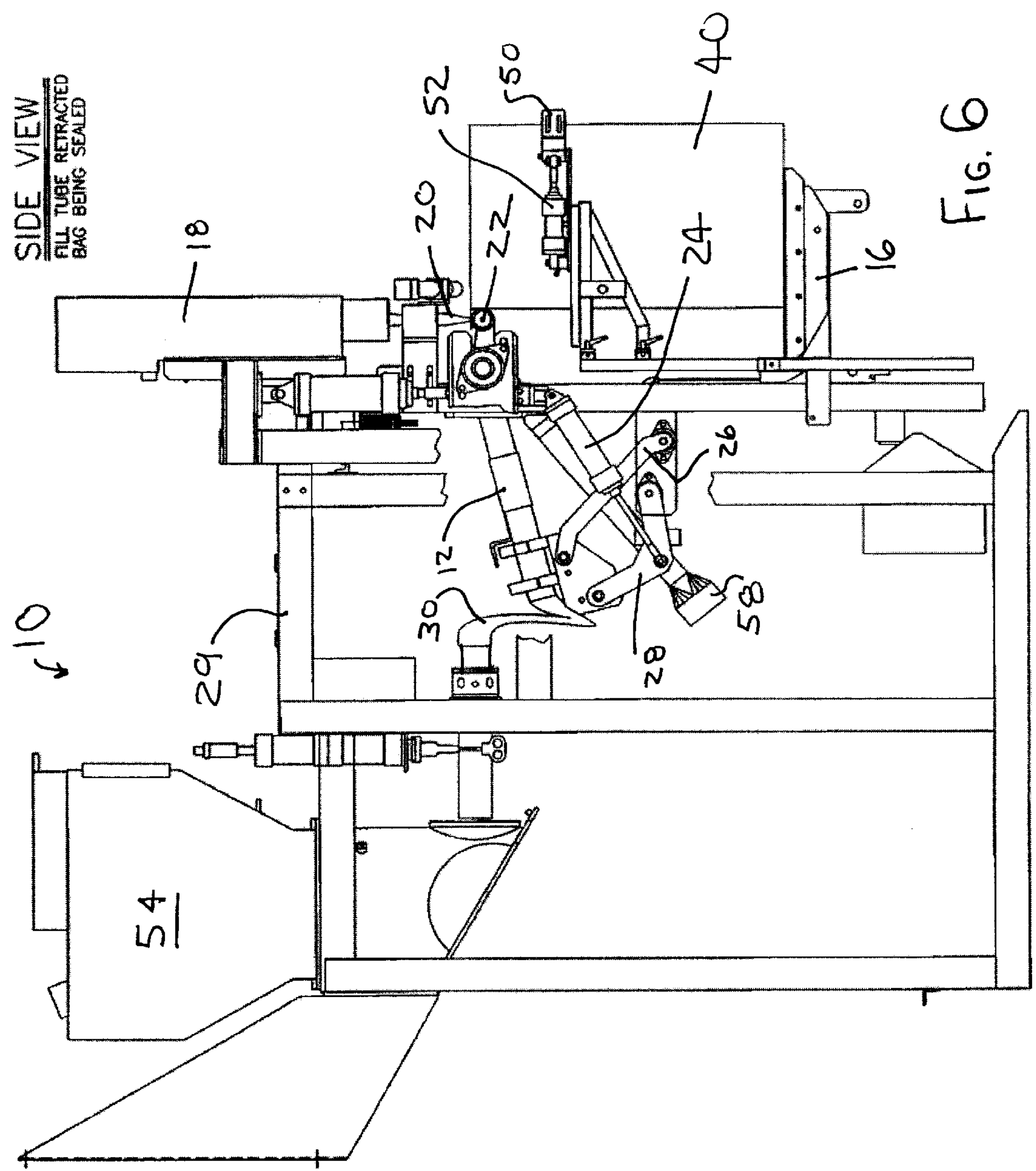
FIG. 6 is a fragmentary side elevation of the filling and sealing apparatus of FIGS. 1–5, showing the filling tube in a retracted position and further showing a bag being sealed, in which the rear bag flaps are closed.

FIG. 4 is a further, slightly enlarged view of filling and sealing apparatus 10, showing filling tube 12 in its extended position. FIG. 5 shows filling tube 12 in its retracted position. FIG. 6 is a fragmentary side elevation of the filling and sealing apparatus of FIGS. 1–5, showing the filling tube in a retracted position and further showing a bag being sealed.

In operation, sealable valved bags are placed, by any suitable mechanism (conveyor belt, powered roller table, bag holding and indexing mechanism) such as are known in the art, at support 16, in an upright position, with the protruding valve structure pointing toward filling and sealing apparatus 10. Typically, in the process of raising the bags, a gripping mechanism, as a known in the art, may squeeze the top of the bag slightly, so as to pop open the end of the valve structure, for facilitating entry of nozzle 14. A pushing device (not shown) may be employed for slightly propelling the bag toward the nozzle, or, in an alternative embodiment, for simply holding the bag in place, while the nozzle is being inserted into the valve tube of a stationary bag.

In a preferred embodiment of the invention, filling tube 12 is in its extended position and stationary, when a bag 40 is placed on support 16, and then pushed onto nozzle 14 (to assume the position shown in phantom in FIG. 4), such as by a piston actuated pusher or bag gripping device (not shown). In an alternative embodiment, nozzle 14 is inserted into the open valve tube of a stationary bag 40.

In either embodiment, the movement of nozzle 14 is the same. To extend nozzle 14, cylinder(s) 24 is/are actuated to withdraw the pistons. Linkages 26 and 28 pivot forward and filling tube 12 moves in a complex arc, toward the right, from the position shown in FIG. 5, to the position shown in FIG. 1, 3 or 4. Once pivoting of filling tube 12 has been completed and valve 42 has been placed on nozzle 14 (or nozzle 14 inserted into valve structure 42), filling of bag 40 can commence. Using a pump or other suitable means, the material to fill bag 40 is supplied from a source, such as hopper 54 and flows in the direction indicated by arrow F.

Linkage cylinder(s) 24 may be hydraulic or pneumatic piston and cylinder(s). In order to accommodate the upward pivoting of filling tube 12, flexible tube 30 is collapsed and folded downward.

In either embodiment, as mentioned herein, suitable wiring, tubing and control mechanisms (suitably programmed or connected to control actuators, using known control techniques) may be provided, for the selective and/or automated actuation of cylinder(s) 24 between the retracted and extended positions.

After filling has been completed (based upon timing of flow, volumetric measurement upstream of filling tube 12, or measurement of weight at support 16, among other possible cut-off determination techniques), filling tube 12 is generally pivoted backward from, and nozzle 14 tilted upward with respect to, bag 40, so that nozzle 14 is removed from valve structure 42. Apparatus 10 thus returns to the orientation shown in FIG. 5.

In either embodiment of the invention, whether bag 40 is pushed onto a stationary nozzle 14 or whether nozzle 14 is pushed into a stationary bag 40, the relative positions of the pivot points for the linkages, and the lengths of the linkages, are preferably selected so that during the pivoting movement of filling tube 12 away from bag 40, the initial movement of the nozzle 14 is to actually initially dip downwardly, relative to valve structure 42, before filling tube 12, as a whole pivots backward away from and tilts upward relative to bag 40. Such a pivoting movement may be readily accomplished by one of ordinary skill in the art, having the present disclosure before them.

Figure 7:
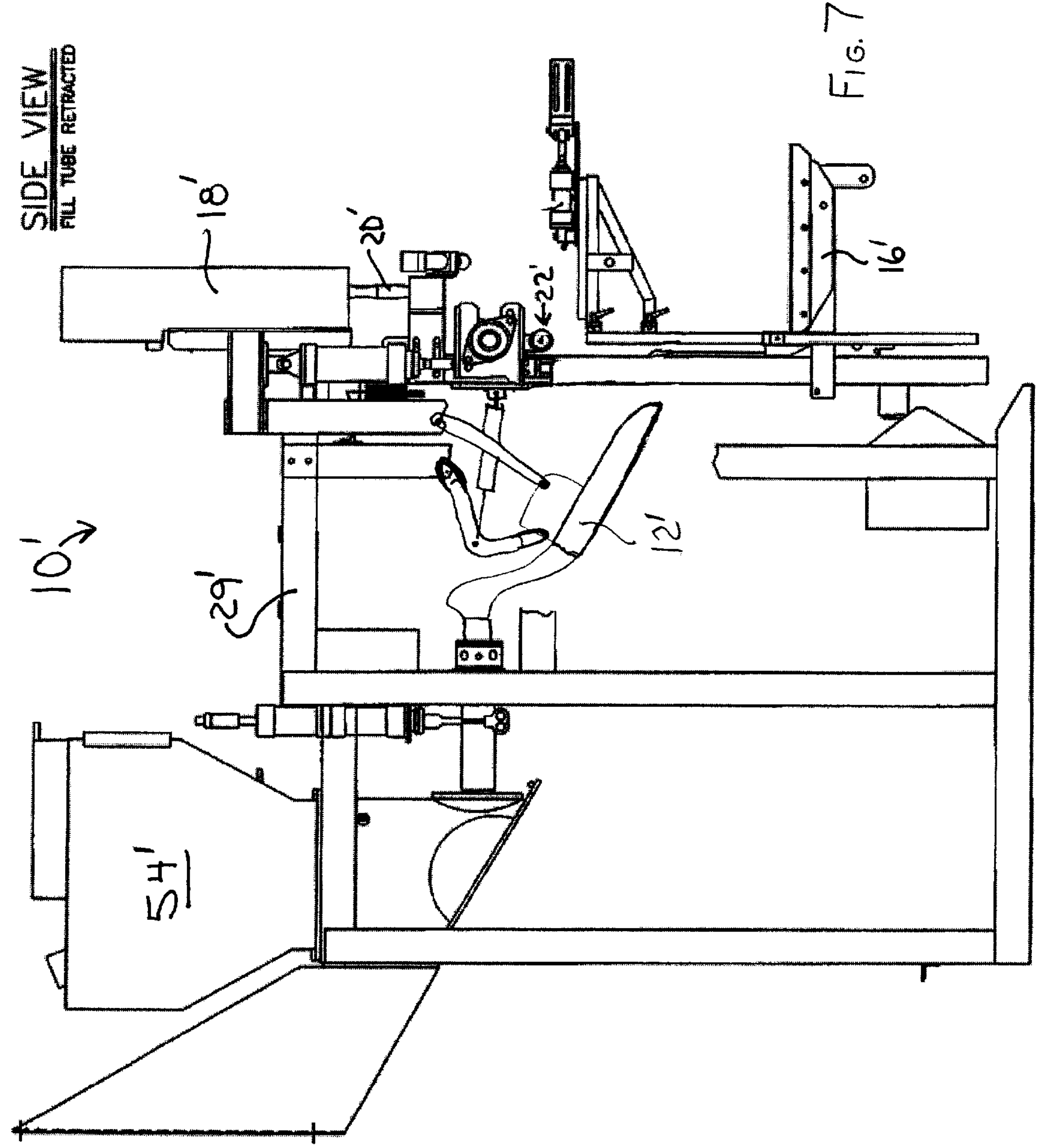
FIG. 7 is a side elevation of an alternative embodiment of the invention, in which the filling nozzle is configured to tilt downwardly, when moved away from the bag valves.

In the embodiment(s) shown in FIGS. 1–6, the linkages connected to filling tube 12 are connected to the lower side of filling tube 12, and are below tube 12 and configured, so that tube 12 pivots up and away, in the retracted position, from bag 40. An alternative embodiment of apparatus 10' is shown in FIG. 7, wherein structures having functions analogous to those of the embodiment of FIGS. 1–6 are provided with like reference numerals, augmented by a prime ('), including tube 12', chair 16', sealer 18', horn 20', anvil 22', framework 29' and hopper 54', among other elements. Suitable linkage is positioned above tube 12', and connected to the upper side of tube 12', so that tube 12' pivots down and away, in its retracted position, from the bag position. This embodiment would provide a self-cleaning feature to the nozzle, in that any filling material left in the tube could be tipped out. In a further alternative embodiment of the invention, tube 12 could be configured to simply move in a horizontal plane, longitudinally toward and away from bag 40, as shown in FIG. 7.

Next, sealing is accomplished. The sealing apparatus comprises sealer 18, and anvil 22. One possible mechanism that may be used may be identical or similar to that employed in Wadium et al., U.S. Pat. No. 5,244,532 (in which sealer 18 employs an ultrasonic vibration horn 20), except that the anvil (instead of the horn) is pivotably mounted. When a bag is being filled, or moved in or out of the filling station, anvil 22 is in the position shown in solid lines in FIGS. 1, 4 and 5.

Once filling has been completed, anvil 22 is rotated outwardly and upwardly, in the direction indicated by arrow P in FIG. 5, to the position indicated in FIG. 6. Anvil 22 may be pivotably mounted and propelled by suitable linkages and propulsion mechanisms, similar to those employed moving filling tube 12, or by other mechanisms understood by those of ordinary skill in the art. More or less simultaneously, horn 20 is lowered, in the direction of arrow D, FIG. 5 (e.g., by a suitably controlled piston and cylinder system, or other mechanism), until valve structure 42 is clamped between horn 20 and anvil 22, as shown in FIG. 6. Ultrasonic vibrations (or heat or both) are then applied for a sufficient period of time and to a sufficient degree to activate the adhesive or sealable liner of valve structure 42.

Upon completion of the sealing step, horn 20 is raised and anvil 22 is pivoted downwardly and away from bag 40, and the filled and sealed bag 40 is moved away from support 16, and replaced by a successive empty, upright bag 40 with slightly opened valve structure 42, ready to receive nozzle 14, or to be pushed onto nozzle 14.

The present invention is believed to provide several advantages over prior art systems, including increased speed and ease of handling, reduced complexity of machinery (with inherent increased reliability and reduced cost), and substantial reduction in required floor space ("footprint").

A further advantage of the present apparatus and method is that enhanced dust collection is provided. In prior art filling systems, in which sealing occurs at a location remote from the filling location, there are numerous opportunities for contamination of the surroundings by escaping filling material (generally referred to as "dust" or "dusting"). Even those bags, which may be provided with internal temporary closure mechanisms, intended to reduce dusting between filling and sealing, cannot completely eradicate the escape of filling material. In addition, the filling process itself, creates a cloud of filling material around the filling apparatus, and removal of the filling tube from the bag also is an event that may result in the release of filling material or "dust".

In such prior art filling systems, a vacuum-operated dust collection system may be provided, that can collect some of the particulate material that escapes during the filling process. However, such a system cannot help in collecting "dust" that escapes from a bag that has been moved from the filling station, when the bag is transported, raised, and presented to a sealing mechanism (all of which steps presents an opportunity for dusting).

In the present situation, because the bag never leaves the bag chair, the dust collection system can operate continuously, collecting stray filling material before and during filling, while the spout is withdrawn from the valve tubes, while the bag is being prepared for sealing, and after sealing, when filling material that may be on the outside of the sealed bag may be disturbed as the bag is ultimately moved away from the filling/sealing station.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

We claim:

1. An apparatus for filling and sealing one or more sealable valved bags, wherein the sealable valved bags are provided with outwardly extending sealable valve structures, the apparatus being disposed at a selected position along a processing path, the apparatus comprising:

a support operably configured for receiving, in succession, a plurality of sealable valved bags, the support being operably configured to maintain each successive sealable valved bag in an upright, substantially erect orientation, with its sealable valve structure extending substantially horizontally toward the apparatus for filling and sealing one or more containers;

a filling tube, operably connectable at one end to a source of filling material, the filling tube further having at an opposite end a filling nozzle, operably configured to enable the sealable valve structure of a sealable valved bag to fit around the filling nozzle, the filling tube being operably configured to be reciprocably moved between a filling position to enable operable engagement with the sealable valve structure of a sealable valved bag, and a standoff position substantially removed from the sealable valved bag, the filling tube being further operably positioned at a selected position along the processing path; and a sealing apparatus, also operably at said selected position along the processing path, the sealing apparatus including at least one sealing member operably configured to be reciprocably moved between a sealing position in operable engagement with a sealable valve structure of a sealable valved bag, and a standoff position substantially removed from the sealable valved bag.

2. The filling and sealing apparatus according to claim 1, wherein the filling tube is configured to reciprocably pivot and translate between a horizontal filling position and a retracted position, in which the filling tube is tilted, filling nozzle upward, and moved backward from the horizontal filling position.

3. The filling and sealing apparatus according to claim 1, wherein the filling tube is configured to reciprocably pivot and translate between a horizontal filling position and a retracted position, in which the filling tube is tilted, filling nozzle downward, and moved backward from the horizontal filling position.

4. The filling and sealing apparatus according to claim 1, wherein the filling tube is configured to reciprocably move horizontally, between a filling position and a position moved backward from the filling position.

5. The filling and sealing apparatus according to claim 1, wherein the sealing member includes at least one of: an ultrasonic horn, an ultrasonic anvil.

6. The filling and sealing apparatus according to claim 1, wherein the sealing member includes at least one of: a heat sealing member, an anvil.

7. The filling and sealing apparatus according to claim 1, wherein the support further comprises at least one bag bottom support member, operably disposed to vertically support bags, presented in succession, for filling and subsequent sealing.

8. The filling and sealing apparatus according to claim 1, wherein the support further comprises at least one bag side support member, operably disposed for restricting lateral movement of bags, presented in succession, for filling and subsequent sealing.

9. The filling and sealing apparatus according to claim 1, wherein the support further comprises at least one bag back support member, operably disposed for selectively restricting backward movement away from the filling tube and sealing apparatus of bags, presented in succession, for filling and subsequent sealing.

10. The filling and sealing apparatus according to claim 9, wherein the at least one bag back support member is operably configured to reciprocate between an open position, permitting a bag to be presented to and removed from the filling tube and sealing apparatus, and a closed position, preventing undesired movement of a bag away from the filling tube and sealing apparatus.

11. The filling and sealing apparatus according to claim 1, further comprising dust collection apparatus, operably configured for collecting and transporting away from the filling and sealing apparatus, stray filling material.

12. The filling and sealing apparatus according to claim 1, wherein the dust collection apparatus further comprises:

a flexible dust collection shroud, operably disposed to surround at least a portion of the filling tube; and a dust collection tube, connected to the flexible dust collection shroud and to a source of suction, the flexible dust collection shroud being configured to accommodate reciprocable movement of the filling tube, so that collection of stray filling material may be conducted substantially continuously during operation of the filling and sealing apparatus.

13. A method for filling and sealing one or more sealable valved bags, wherein the sealable valved bags are provided with outwardly extending sealable valve structures, the apparatus being disposed at a selected position along a processing path, the method comprising the steps of:

placing a sealable valved bag in an upright position on a support operably configured for receiving, in succession, a plurality of sealable valved bags, the support being operably configured to maintain each successive sealable valved bag in an upright, substantially erect orientation, with its sealable valve structure extending substantially horizontally toward the apparatus for filling and sealing one or more containers;

filling the bag with a filling tube, operably connectable at one end to a source of filling material, the filling tube further having at an opposite end a filling nozzle, operably configured to enable the sealable valve structure of a sealable valved bag to fit around the filling nozzle, the filling tube being operably configured to be reciprocably moved between a filling position to enable operable engagement with the sealable valve structure of a sealable valved bag, and a standoff position substantially removed from the sealable valved bag, the filling tube being further operably positioned at a selected position along the processing path; and sealing the bag with a sealing apparatus, while maintaining the bag in its upright position on the support, the sealing apparatus including at least one sealing member operably configured to be reciprocably moved between a sealing position in operable engagement with a sealable valve structure of a sealable valved bag, and a standoff position substantially removed from the sealable valved bag; and further comprising the step of reciprocably pivoting and translating the filling tube between a horizontal filling position and a retracted position, in which the filling tube is tilted, filling nozzle upward, and moved backward from the horizontal filling position.

14. The method according to claim 13, further comprising the step of providing the sealing member in the form of at least one of: an ultrasonic horn, an ultrasonic anvil.

15. The method according to claim 13, further comprising the step of providing the sealing member in the form of at least one of: a heat sealing member, an anvil.

16. The method according to claim 13, further comprising the step of operably disposing at least one bag bottom support member, to vertically support bags, presented in succession, for filling and subsequent sealing.

17. The method according to claim 13, further comprising the step of operably disposing at least one bag side support member, for restricting lateral movement of bags, presented in succession, for filling and subsequent sealing.

18. The method according to claim 13, further comprising the step of operably disposing at least one bag back support member, for selectively restricting backward movement away from the filling tube and sealing apparatus of bags, presented in succession, for filling and subsequent sealing.

19. The method according to claim 18, further comprising the step of reciprocating the at least one bag back support member between an open position, permitting a bag to be presented to and removed from the filling tube and sealing apparatus, and a closed position, preventing undesired movement of a bag away from the filling tube and sealing apparatus.

20. The method according to claim 13, further comprising the step of collecting and transporting away from the filling and sealing apparatus, stray filling material, using dust collection apparatus.

21. The method according to claim 13, further comprising the step of disposing a flexible dust collection shroud to surround at least a portion of the filling tube; and connecting a dust collection tube, to the flexible dust collection shroud and to a source of suction, the flexible dust collection shroud being configured to accommodate reciprocable movement of the filling tube, so that collection of stray filling material may be conducted substantially continuously during operation of the filling and sealing apparatus.

22. A method for filling and sealing one or more sealable valved bags, wherein the sealable valved bags are provided with outwardly extending sealable valve structures, the apparatus being disposed at a selected position along a processing path, the method comprising the steps of:

placing a sealable valved bag in an upright position on a support operably configured for receiving, in succession, a plurality of sealable valved bags, the support being operably configured to maintain each successive sealable valved bag in an upright, substantially erect orientation, with its sealable valve structure extending substantially horizontally toward the apparatus for filling and sealing one or more containers;

filling the bag with a filling tube, operably connectable at one end to a source of filling material, the filling tube further having at an opposite end a filling nozzle, operably configured to enable the sealable valve structure of a sealable valved bag to fit around the filling nozzle, the filling tube being operably configured to be reciprocably moved between a filling position to enable operable engagement with the sealable valve structure of a sealable valved bag, and a standoff position substantially removed from the sealable valved bag, the filling tube being further operably positioned at a selected position along the processing path; and sealing the bag with a sealing apparatus, while maintaining the bag in its upright position on the support, the sealing apparatus including at least one sealing member operably configured to be reciprocably moved between a sealing position in operable engagement with a sealable valve structure of a sealable valved bag, and a standoff position substantially removed from the sealable valved bag; and further comprising the step of reciprocably pivoting and translating the filling tube between a horizontal filling position and a retracted position, in which the filling tube is tilted, filling nozzle downward, and moved backward from the horizontal filling position.

23. A method for filling and sealing one or more sealable valved bags, wherein the sealable valved bags are provided with outwardly extending sealable valve structures, the apparatus being disposed at a selected position along a processing path, the method comprising the steps of:

placing a sealable valved bag in an upright position on a support operably configured for receiving, in succession, a plurality of sealable valved bags, the support being operably configured to maintain each successive sealable valved bag in an upright, substantially erect orientation, with its sealable valve structure extending substantially horizontally toward the apparatus for filling and sealing one or more containers;

filling the bag with a filling tube, operably connectable at one end to a source of filling material, the filling tube further having at an opposite end a filling nozzle, operably configured to enable the sealable valve structure of a sealable valved bag to fit around the filling nozzle, the filling tube being operably configured to be reciprocably moved between a filling position to enable operable engagement with the sealable valve structure of a sealable valved bag, and a standoff position substantially removed from the sealable valved bag, the filling tube being further operably positioned at a selected position along the processing path; and sealing the bag with a sealing apparatus, while maintaining the bag in its upright position on the support, the sealing apparatus including at least one sealing member operably configured to be reciprocably moved between a sealing position in operable engagement with a sealable valve structure of a sealable valved bag, and a standoff position substantially removed from the sealable valved bag; and further comprising the step of reciprocably moving the filling tube horizontally, between a filling position and a position moved backward from the filling position.

* * * * *